Figure 1:
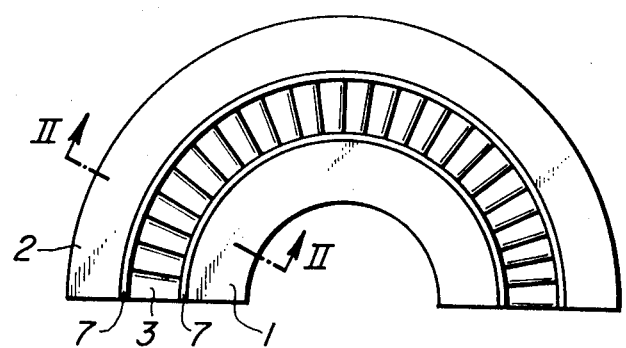

United States Patent [19]

Yonezawa et al.

[11] 3,999,031
[45] Dec. 21, 1976

[54] METHOD FOR ELECTRON-BEAM WELDING OF DISSIMILAR METALS

[75] Inventors: Tatsuo Yonezawa, Hitachi; Takamitsu Nakazaki, Takahagi; Hisanao Kita; Tomohiko Shida, both of Hitachi, all of Japan

[73] Assignee: Hitachi, Ltd., Japan

[22] Filed: Jan. 31, 1975

[21] Appl. No.: 546,016

[30] Foreign Application Priority Data

Feb. 8, 1974 Japan .............. 49-15465

[52] U.S. Cl. .................. 219/121 EM; 219/118
[51] Int. Cl.² ......................... B23K 15/00
[58] Field of Search ........... 219/121 EB, 121 EM, 219/121 L, 121 LM, 137, 69 M, 69 R, 118, 76; 250/492, 493

[56] References Cited

UNITED STATES PATENTS

| | | | |
|---|---|---|---|
| 2,985,747 | 5/1961 | Kutchera | 219/137 |
| 3,582,605 | 6/1971 | Lamatsch | 219/121 EB |
| 3,617,685 | 11/1971 | Brill-Edwards et al. | 219/121 EB |
| 3,808,395 | 4/1974 | Bailey et al. | 219/121 EM |

*Primary Examiner*—J. V. Truhe
*Assistant Examiner*—G. R. Peterson
*Attorney, Agent, or Firm*—Craig & Antonelli

[57] ABSTRACT

A method whereby defect-free welds can be produced in joining metallic members of dissimilar materials by electron-beam welding. The method consists in inserting one of the metallic members in openings formed in a metallic plate of the same material as the other metallic member and welding one metallic member to the metallic plate by providing a weld metal, providing by overlay welding on the weld metal a padding metal of a material substantially similar to that of the other metallic member but lower in oxygen content, effecting machining of the outer surface of the padding metal to form a faying surface, and joining by electron beam welding the faying surface of the padding metal to a faying surface formed on the other metallic member whereby the faying surfaces can be rigidly welded.

8 Claims, 2 Drawing Figures

METHOD FOR ELECTRON-BEAM WELDING OF DISSIMILAR METALS

This invention relates to methods for electron-beam welding for joining metallic members which are made of dissimilar materials, and more particularly it is concerned with a method of producing by electron-beam welding a turbine diaphragm in which nozzle blades and inner and outer rings are made of dissimilar materials.

In one method of welding generally used for producing a turbine diaphragm arranged between the rows of moving blades of a steam turbine according to the prior art, a multiplicity of nozzle blades arranged annularly are joined by seal welding to partition plates through openings formed in the partition plates which are arranged concentrically and disposed on inner and outer peripheries of the nozzle blades. The partition plates are joined by submerged arc welding to the inner and outer rings by providing a large amount of padding metal by build up welding, thereby completing a turbine diaphragm.

The aforementioned welding method of the prior art has a disadvantage in that thermal deformation is caused to occur in the diaphragm by welding heat input, because build up welding is effected by using a submerged arc welding method to provide a large amount of padding metal. In order to obviate this disadvantage, proposals have been made to use an electron-beam welding method in place of the submerged arc welding method in producing a turbine diaphragm. However, the use of electron-beam welding entails the possibilities of weld defects being caused to occur if electron-beam welding is directly effected on faying surfaces of metals of dissimilar materials, although no problem is faced with if the metals to be joined are of the same material. The problem is that a stray magnetic field due to differences is thermo-electromotive forces between the two metals of dissimilar materials will cause a bead, which is formed by fusion penetration of metal by the electron beam, to bend and deviate from the faying surfaces.

To obviate this disadvantage, attempts have been made to provide improvements. These attempts have succeeded in obviating the aforementioned disadvantage of bending of the bead produced. However, the new attempts have raised a new problem which needs to be solved. According to one of the proposed improvements, there is provided a method of electron-beam welding of a turbine diaphragm in which each partition plate is made in the form of a letter U from the same material as inner and outer rings, and each end portion of a nozzle blade made from a dissimilar material is inserted through openings formed in the bottom of the respective U-shaped partition plate and secured thereto by seal welding. Then, a padding metal is provided on the seal weld by using a metal similar to that of the inner and outer rings so as to fill the gap of the U-shaped partition plate, thereby rigidly securing the nozzle blade to the partition plates. Thereafter, the outer surface of the padding metal is machined to bring the same to the same level as the partition plates, thereby providing a faying surface. The faying surface thus formed is joined to the faying surface of the inner or outer ring by electron-beam welding to provide a completed turbine diaphragm.

It will be seen that the improved method described above can achieve the result of preventing bending of the bead produced by electron-beam welding effected on the faying surfaces by using metals of the same material to provide the faying surfaces. However, the improved method is not without disadvantages. Because electron-beam welding is effected on the padding metal, a large amount of oxygen contained in the padding metal has tended to cause defects to occur in the welds, such as formation of cracks or blow-holes in the welds produced by electron-beam welding. This type of weld defects is a phenomenon which has not been encountered when electron-beam welding was effected on steel plates of the common type. This phenomenon was particularly noticeable when the padding metal was provided by using a metal which is a chromium-molybdenum alloy steel.

An object of this invention is to provide a welding method which can produce defect-free welds by electron-beam welding when metallic members of dissimilar materials are joined by an electron-beam welding method.

Another object of the invention is to provide a welding method which is capable of effecting electron-beam welding on metallic members of dissimilar materials to joint the same without bending of the welds produced by electron-beam welding between the faying surfaces and without causing other weld defects to occur.

Still another object of the invention is to provide a welding method for producing a turbine diaphragm wherein nozzle blades and inner and outer rings of dissimilar materials can be joined by electron-beam welding without causing weld defects to occur.

According to the invention, there is provided a method of welding metals of dissimilar materials which need to be joined. The outstanding characteristic of the invention is that one metallic member made of one material is secured to a metallic plate of the same material as the other metallic member of another material by having its end portion fitted in openings formed in the metallic plate. One metallic member is welded to the metallic plate by using a metal which is substantially similar in material to the other metallic member but lower in oxygen content by forming a weld in the portion of the metallic plate in which one metallic member is fitted. Then, a faying surface is formed on the weld metal and brought into abutting engagement with the faying surface of the other metallic member, and electron-beam welding is effected on the faying surfaces to join them by the impact exothermic action of an electron-beam, whereby the metallic members of dissimilar materials can be welded.

Figure 2:
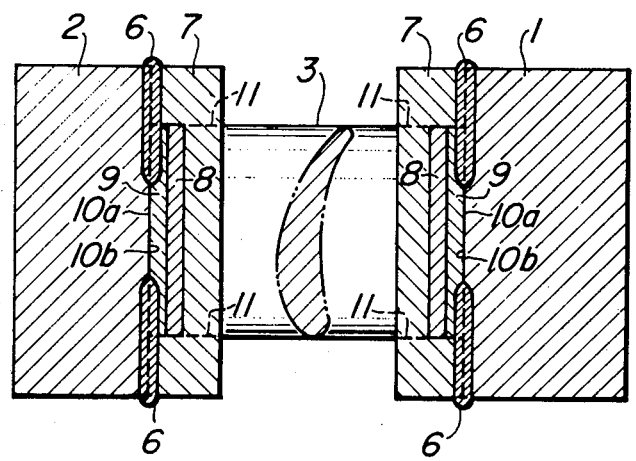

FIG. 1 is a front view of a turbine diaphragm adapted for use with a steam turbine device; and FIG. 2 is a sectional view taken along the line A—A of FIG. 1 and showing the electron-beam welded structure of a turbine diaphragm consisting of metallic members of dissimilar materials which comprises one embodiment of the invention.

The construction of a turbine diaphragm used with a steam turbine is schematically shown in FIG. 1. As shown, a multiplicity of nozzle blades providing a path of steam are made of 13 Cr steel and arranged annularly. The nozzle blades 3 are joined by electron-beam welding to an inner ring 1 and an outer ring 2 through partition plates 7 each made of a material similar to the material of the inner and outer rings 1 and 2 which may be low alloy steel or carbon steel.

FIG. 2 shows the structure consisting of parts welded together of a turbine diaphragm which comprises one embodiment of the invention. More specifically, the partition plates 7 joined by overlay welding to opposite end portions of each nozzle blade 3 made of 13 Cr steel are made of a material similar to that of an inner ring 1 and an outer ring 2 which are made of a 1 Cr-0.5 Mo steel or a 2¼ Cr-1 Mo steel. Each partition plate 7 which is made in ring form by cold working or hot working has a thickness of 16 to 30 millimeters and is in the form of a letter U in cross-section. A plurality of openings 11 spaced apart from one another a suitable distance are formed by electro-spark machining or electrolytic machining in the bottom of each partition plate 7 of the U-shape. Each of the openings 11 receives therein about 5 to 6 millimeter of an end portion of each nozzle blade 3. Then, submerged arc welding is effected by using a welding electrode of the same material as the inner and outer rings 1 and 2 or a 1 Cr-0.5 Mo steel or a 2¼ Cr-1 Mo steel to successively fill the openings 11 of each partition plate 7 with a padding metal 8 so that each nozzle blade 3 is positively connected to the two partition plates 7.

The padding metal 8 which is similar in material to the inner and outer rings 1 and 2 is intended to tentatively secure the two partition plate 7 to each nozzle blade 3. Thus, the Ushaped portion of each partition plate 7 formed with the openings 11 is not completely filled but a recess of a depth of 5 or 6 millimeters is left unfilled. Immediately following the submerged arc welding or after effecting annealing as an intermediate step, inert-gas tungsten-arc welding or inert-gas metal-arc welding is effected in a chamber full of argon gas of a purity of over 99.9% or in an inert gas atmosphere of high purity, so as to fill the recess of the depth of 5 or 6 millimeters with a padding weld metal 9 which is similar in material to the inner and outer rings 1 and 2 and of oxygen content of under 100 PPM. By this arrangement, the partition plates 7 are rigidly connected to each nozzle blade 3 in a perfect manner.

It is necessary that the padding weld metal 9 should be lower in the oxygen content of the metal than the padding metal 8 to a degree such that the metal 9 is similar in oxygen content to steel materials generally used for producing the inner and outer rings 1 and 2. Thus, it will be understood that it is for the purpose of reducing the oxygen content of the padding weld metal 9 to under 100 PPM or a level of ordinary steel materials that the overlay welding is effected in an inert gas atmosphere of high purity as aforementioned.

Then, the outer surfaces of each partition plate 7 and each padding weld metal 9 are machined by ensuring that the padding weld metal 9 has a thickness of over 3 millimeters, so as to form faying surfaces 10a which are to be welded to the inner ring 1 and the outer ring 2 by electron-beam welding. Faying surfaces 10b are formed on the inner ring 1 and the outer ring 2, the faying surfaces 10a are brought into abutting engagement with the faying surfaces 10b and electron-beam welds 6 are produced therebetween by electron-beam welding. By this arrangement, the partition plates 7 can be rigidly connected to the inner and outer rings 1 and 2. The reason why each padding weld metal 9 has a thickness of over 3 millimeters is that each electron beam weld 6 may be formed in the welding zone of the padding weld metal 9, in view of the fact that the width of the metal melted by electron-beam welding is generally about 2 millimeters in width at one side.

Experiments were carried out on electron-beam welding effected on the padding weld metal 9 to find out if defects are caused to occur in the electron-beam welds 6 by using both 1 Cr-0.5 Mo steels and 2¼ Cr-1 Mo steels as materials for the padding weld metal 9 and by varying the chemical composition and oxygen content of the padding weld metal 9. The results of the experiments obtained are shown in Table 1 and Table 2.

In Table 1 and Table 2, there are shown the conditions of the welds produced by effecting electron-beam welding on a steel material made of the same material as the padding weld metal 9 and serving as a parent metal. In the column of the parent metal in the tables, the "padding H" refers to a padding weld metal provided by manual welding, the "padding S" to a padding weld metal provided by submerged arc welding, and the "padding T" to a padding weld metal provided by inert-gas tungsten-arc welding. The "padding $S_1$", "padding $S_2$" and "padding $S_3$" indicate different combinations of a welding wire and a flux.

Table I

| Type of Steel | Base Metal | Chemical Components and Oxygen Content | | | | | | | | Conditions of Electron-Beam Welds | |
|---|---|---|---|---|---|---|---|---|---|---|---|
| | | C | Si | Mn | S | P | Cr | Mo | $O_2$(ppm) | Cracks | Blow-holes |
| 1Cr | Steel Plate | 0.12 | 0.22 | 0.68 | 0.018 | 0.015 | 0.99 | 0.50 | 48 | O | O |
| | Padding H | 0.037 | 0.86 | 0.72 | 0.017 | 0.008 | 1.26 | 0.55 | 504 | Δ | Δ |
| 0.5Mo | Padding $S_1$ | 0.047 | 0.21 | 0.46 | 0.008 | 0.011 | 1.37 | 0.29 | 280 | Δ | Δ |
| Alloy | Padding $S_2$ | 0.068 | 0.40 | 0.72 | 0.003 | 0.011 | 1.21 | 0.29 | 814 | X | X |
| Steel | Padding $S_3$ | 0.049 | 0.45 | 0.76 | 0.007 | 0.017 | 1.20 | 0.56 | 820 | Δ | X |
| | Padding T | 0.046 | 0.42 | 1.12 | 0.008 | 0.008 | 1.20 | 0.54 | 98 | O | O |

Condition of Welds
O: Excellent
Δ: Fairly Good
X: Occurrence of Weld Defects

Table 2

| Type of Steel | Base Metal | Chemical Components and Oxygen Content | | | | | | | | Conditions of Electron-Beam Welds | |
|---|---|---|---|---|---|---|---|---|---|---|---|
| | | C | Si | Mn | S | P | Cr | Mo | $O_2$(ppm) | Cracks | Blow-holes |
| 2¼Cr | Steel Plate | 0.13 | 0.24 | 0.52 | 0.008 | 0.027 | 2.48 | 1.01 | 41 | O | O |
| | Padding H | 0.05 | 0.66 | 0.66 | 0.015 | — | 2.31 | — | 434 | X | X |

Table 2-continued

| Type of Steel | Base Metal | Chemical Components and Oxygen Content | | | | | | | | Conditions of Electron-Beam Welds | |
|---|---|---|---|---|---|---|---|---|---|---|---|
| | | C | Si | Mn | S | P | Cr | Mo | $O_2$(ppm) | Cracks | Blow-holes |
| 1Mo Alloy Steel | Padding $S_1$ | 0.08 | 0.24 | 0.45 | 0.010 | — | 2.40 | — | 265 | X | Δ |
| | Padding $S_2$ | 0.068 | 0.34 | 0.84 | 0.004 | 0.022 | 2.26 | 1.02 | 310 | X | Δ |
| | Padding $S_3$ | 0.059 | 0.23 | 0.45 | 0.015 | 0.010 | 2.35 | 1.11 | 455 | Δ | X |
| | Padding T | 0.047 | 0.46 | 1.08 | 0.007 | 0.008 | 2.32 | 1.06 | 92 | O | O |

Condition of Welds
O: Excellent
Δ: Fairly Good
X: Occurrence of Weld Defects

The results of the experiments shown in Table 1 and Table 2 show that defect-free welds can be produced when the parent metal on which electron-beam welding is effected is a steel plate. It will be seen, however, that the results achieved by electron-beam welding effected on the padding weld metal provided by manual welding or submerged arc welding are poor, the defects being particularly marked when 2¼ Cr-1 Mo alloy steels are employed. In view of the results obtained, it will be seen that, in order to prevent occurrences of blowholes which constitute one type of weld defects, it is effective to use a padding weld metal of low carbon and low $O_2$ content to preclude the production of gas due to the CO reaction. Regarding another type of weld defects or cracks, it will be seen that the padding weld metal is more liable to develop cracks than the steel plate in spite of the fact that the padding weld metal is similar in chemical composition to the steel plate or the carbon content and sulphur content of the former are lower than those of the latter. It was presumed that this phenomenon was due to differences in $O_2$ content between the steel plate and padding weld metal. Therefore, an attempt was made to produce a padding weld metal whose $O_2$ content is under 100 PPM like the steel plate by inert-gas tungsten-arc welding in an inert gas atmosphere, and electron-beam welding was effected on this padding weld metal. It has been found that the aforementioned method of electron-beam welding is capable of producing welds which are free from defects, e.g. cracks and blow-holes, by means of electron-beam welding.

It has thus been ascertained as the results of the experiments that, if the padding weld metal on which electron-beam welding is effected has an $O_2$ content of under 100 PPM like ordinary steel materials, it is possible to preclude occurrences of defects in welds produced by electron-beam welding. Also, bending of the bead of the weld which would otherwise be caused to occur when electron-beam welding is effected can be precluded if the two metals joined by electron-beam welding are substantially similar, if not same, in material.

One of the advantages offered by the present invention is that metals of dissimilar materials can be joined rigidly by electron-beam welding by producing a weld between the faying surfaces of the two metals which is free from bending of the bead and other defects which would otherwise occur when electron-beam welding is effected. Another advantage is that electron-beam welding can be applied to welding of the component parts of a turbine diaphragm and performed with excellent results. In effecting electron-beam welding, thermal deformation of the diaphragm due to welding heat input can be minimized, and defect-free welds can be produced even in cases in which nozzle blades and inner and outer rings are made of dissimilar materials.

We claim:
1. A method for electron-beam welding of at last first and second metallic members of dissimilar materials comprising the steps of:
    providing a metallic plate having at least one opening and composed of a material substantially similar to a first metallic member to be welded:
    inserting an end portion of a second metallic member to be welded into at least one opening in the metallic plate and welding closed the opening in the metallic plate with a first weld metal;
    overlay welding a padding weld metal on the first weld metal such that the second metallic member is rigidly secured to the metallic plate, the padding weld metal being of a material substantially similar to the first metallic member and having an oxygen content substantially similar to that of the first metallic member;
    machining an outer surface of the padding weld metal to form a faying surface thereon;
    forming a faying surface on the first metallic member; and
    joining the faying surface of the padding weld metal to the faying surface of first metallic member by electron beam welding such that the two faying surfaces are rigidly secured to each other.
2. A method as claimed in claim 1 wherein the metallic plate is U-shaped, the openings being formed on the bottom of the U-shaped metallic plate.
3. A method as claimed in claim 1, wherein the oxygen content of the padding weld metal is maintained to be not more than 100 PPM when it is welded to either metallic member.
4. A method for electron-beam welding of dissimilar metals whereby nozzle blades of a turbine diaphragm are joined to an inner ring and an outer ring, both of a dissimilar material, comprising the steps of:
    forming circular partition plates to which a plurality of nozzle blades are to be secured, these plates being substantially similar in material to inner and outer rings,
    forming an annular groove in each partition plate so that the plate is U-shaped in cross section and having a plurality of openings formed in the bottom of the groove,
    inserting end portions or each nozzle blade in the openings formed in the partition plates, each nozzle blade being made of a material dissimilar to that of the inner and outer rings, and filling opening of each partition plate with a first weld metal to provide a welded joint between each nozzle blade and partition plate, overlay welding a second weld metal of a material substantially similar to that of the inner and outer rings on the first weld metal in the groove of each partition plate, in an atmosphere of an inert gas, so that the oxygen content of the second weld metal is maintained substantially equal to that of the partition plate, and rigidly securing each partition plate to each nozzle blade, machining an outer surface of the second weld metal produced on each partition plate to form a surface to be abutted, abutting machined surface of the second weld metal with those surfaces formed on inner and outer rings and irradiating abutting faying surfaces with an electron beam to join the second weld metal and inner and outer rings by impact heat-generating action of the electron beam such that the nozzle blades and inner and outer rins of dissimilar metals are joined through the partition plates and the weld metal which are substantially similar in material to the inner and outer rings.

5. A method as claimed in claim 4 wherein the oxygen content of the second weld metal is maintained to be not more than 100 PPm when the overlay welding is effected.

6. A method for electron-beam welding of at least two metallic members of dissimilar materials, comprising the steps of:

forming surfaces to be abutted on an outer surface of a first metallic member and that of a second metallic member of dissimilar metal to be joined thereto, providing a metallic plate substantially similar in material to the second metallic member, the metallic plate having at least one opening, and forming a surface to be abutted on an outer surface of the metallic plate providing padding weld metal also substantially similar in material to the second metallic member, inserting one end of the first metallic member into the opening of the metallic plate, and then welding padding weld metal to the opening in an atmosphere of an inert gas, thereby maintaining the oxygen content of said weld metal substantially equal to that of the first metallic member while, at the same time, effecting joining by fusion of the metallic plate to the first metallic member, machining an outer surface of the padding weld metal to form a surface to be abutted thereon, abutting the machined surface of the padding weld metal with a corresponding surface of the second metallic member, and irradiating abutted faying surfaces with an electron beam to join the padding weld metal and the second metallic member by impact heat-generating action of the electron beam such that the first and second metallic members of dissimilar metals are joined through the metallic plate and the padding weld metal, each metallic member contacting a material substantially similar to itself.

7. A method as claimed in claim 6 wherein the metallic plate is U-shaped, and the opening is formed on bottom of the U-shaped metallic plate.

8. A method as claimed in claim 6 wherein the oxygen content of the padding weld metal is maintained to be not more than 100 PPM when it is welded to either metallic member.

* * * * *